United States Patent [19]

Barnsley

[11] Patent Number: 5,604,421
[45] Date of Patent: Feb. 18, 1997

[54] ELECTRICAL SYSTEMS

[75] Inventor: Michael P. Barnsley, Benhall, England

[73] Assignee: Smiths Industries Public Limited Company, London, England

[21] Appl. No.: 433,568

[22] Filed: May 3, 1995

[30] Foreign Application Priority Data

Jun. 18, 1994 [GB] United Kingdom .................. 9412261

[51] Int. Cl.$^6$ ...................................................... H02P 9/00
[52] U.S. Cl. .................................. 322/22; 322/12; 322/37
[58] Field of Search .................................. 322/18, 33, 34; 307/31, 32, 34, 38, 57; 364/492, 494

[56] References Cited

U.S. PATENT DOCUMENTS

| | | | |
|---|---|---|---|
| 3,842,249 | 10/1974 | Geyer et al. ........................ | 235/151.21 |
| 4,321,645 | 3/1982 | Thom et al. ............................... | 361/63 |
| 4,351,023 | 9/1982 | Richer . | |
| 4,403,292 | 9/1983 | Ejzak et al. .............................. | 364/492 |
| 4,967,096 | 10/1990 | Diemer et al. ............................ | 307/19 |
| 5,285,147 | 2/1994 | Rashid ...................................... | 322/28 |
| 5,294,879 | 3/1994 | Freeman et al. ......................... | 322/23 |
| 5,325,043 | 6/1994 | Parro ........................................ | 322/23 |
| 5,422,517 | 6/1995 | Verney et al. ............................ | 307/29 |

FOREIGN PATENT DOCUMENTS 2104247  3/1983  United Kingdom .

*Primary Examiner*—Steven L. Stephan
*Assistant Examiner*—Nicholas Ponomarenko
*Attorney, Agent, or Firm*—Pollock, Vande Sande & Priddy

[57] ABSTRACT

An electrical supply system with two power generators and several items of electrical equipment has a processor that controls disconnection of the equipment if demand should exceed supply. The processor has a hardware switch controlled by outputs from the generators. The processor runs two different programs at the same time but the switch supplies only one of these to the output. When equipment needs to be disconnected, the switch changes to supply the results of the other program to the output and this effects the disconnection. When sufficient supply is restored, the switch changes back to its original state to supply the results of the first program to the output of the processor.

6 Claims, 1 Drawing Sheet

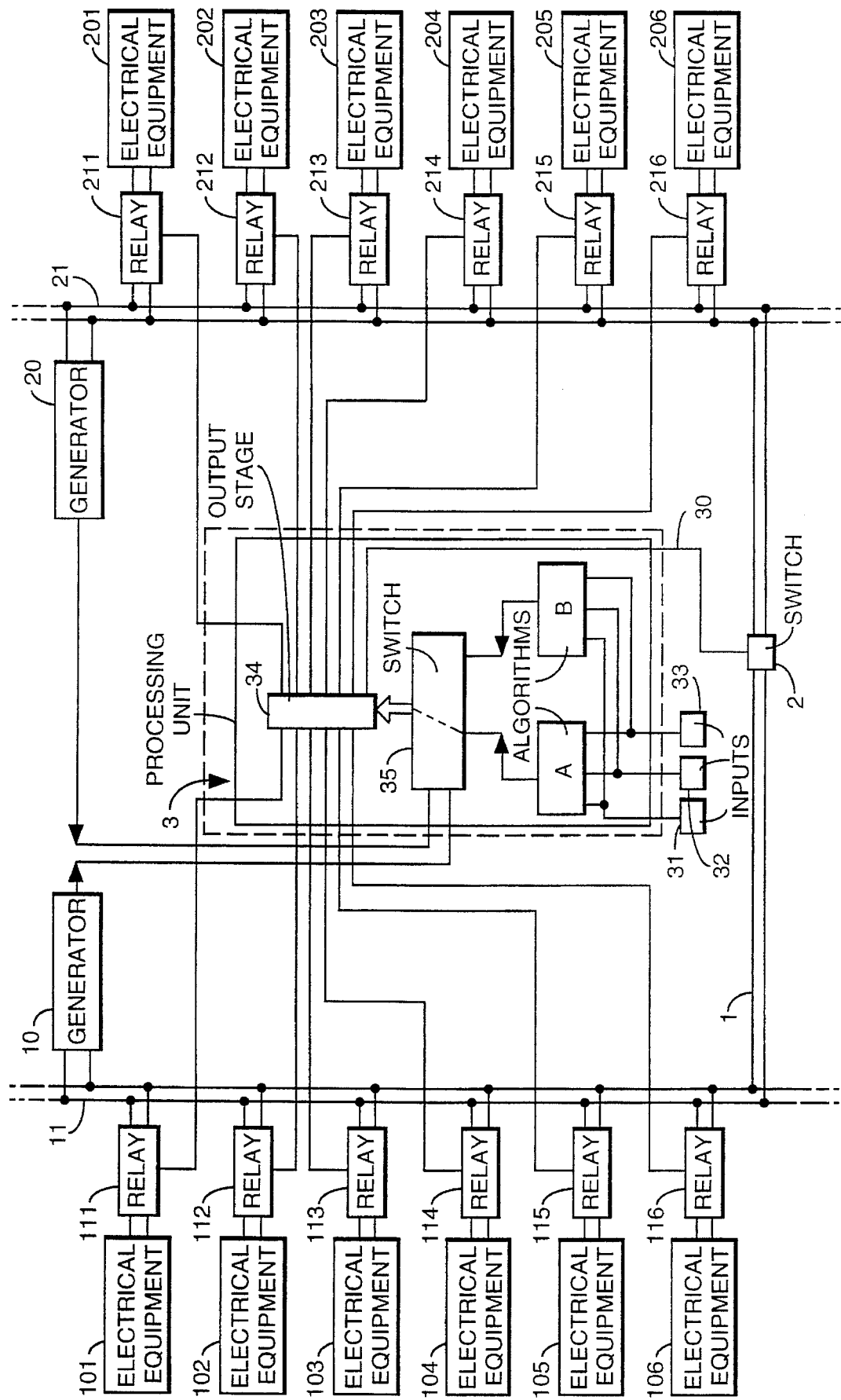

ELECTRICAL SYSTEMS

BACKGROUND OF THE INVENTION

This invention relates to electrical systems.

The power supply in aircraft is provided by several generators to ensure that sufficient power is available for flight-critical equipment in the event that one of the generators should fail. When one of the generators fails it is necessary to switch vital equipment that was supplied by the failed generator to supply by a working generator with minimum interruption to the power supply. Although the power generators can tolerate some overloading for short periods, if the generators are overloaded suddenly, excessively or for prolonged periods, it could cause permanent damage to the generator. The generators are, therefore, provided with protection circuits that shut the generator down if it is seriously overloaded. In order to prevent the working generator being overloaded when the new loads are connected, it is necessary to disconnect, or shed, some of the non-critical loads connected to the working generator before the vital equipment is transferred to it.

The control of power supply to the different items of equipment is generally controlled by a processor receiving inputs from the generators and providing outputs controlling the supply of power to the equipment such as via relays or the like. The outputs are provided as a result of an algorithm or other program computed by the processor during normal operation of the generators. The processor re-computes the system commands at regular intervals, that is, at every processing cycle or at multiples of every processing cycle. If one of the generators should fail, this would be signalled to the processor causing it to run a different, load-shedding algorithm so that appropriate items of equipment are shut down to enable power to be supplied to the flight-critical equipment.

The problem with this arrangement is that there is a time delay before the processor instructs load shedding, which can be equal to that of the processing cycle. Because of this delay, overloading of the working generator can only be avoided by delaying the switching of the critical equipment from the failed generator to the working generator until after the processor has had time to shed the load. The vital equipment is, therefore, deprived of power for a considerable period. Although this delay can be reduced by using high speed processors, the delay is still appreciable.

One alternative way of producing a more rapid response is to interrupt the processing cycle of the processor immediately a fault is detected, suspending the normal program and executing the new load-shedding program with minimal delay. Although this can reduce the delay, the interrupt is non-deterministic since it can occur at any point in the processor program. This makes it difficult to prove that the interrupt will always be serviced correctly and that, after servicing the interrupt, the processor will always return to its normal program in an orderly manner, whatever point the interrupt occurs in the processing cycle.

There are other systems, as well as aircraft power systems, where it is desirable to be able to respond reliably to change in an external stimulus more rapidly than the processing time of a program.

BRIEF SUMMARY OF THE INVENTION

It is an object of the present invention to provide an improved electrical system.

According to one aspect of the present invention there is provided an electrical system including processor means having input means and output means, the processor means being arranged to run first and second different programs at the same time and the input means having switching means operable in response to change in an input signal, to switch the result of a different one of the first and second programs to the output.

The system preferably includes a power generator, the input signal being indicative of whether or not the power generator provides sufficient power for the system. The system preferably includes a plurality of items of electrical equipment, the equipment being supplied with power from the power generator and the second program being arranged to control disconnection of one or more items of electrical equipment in response to loss of power from the generator. Each item of electrical equipment may be connected to the power generator via a respective relay, the second program controlling operation of the relays. The system may include two power generators, the input signal being indicative of correct operation of the two generators. The system may include two power buses connected to respective ones of the generators, some of the items of equipment being connected to one bus and others being connected to the other bus, and the two buses being interconnected by a switch that is normally open but is closed in response to operation of the second program. The results of the first program are preferably normally connected to the output means and the results of the second program are connected to the output means when the switching means is operated, the first program remaining running after operation of the switching means so that the results of the first program can be connected to the output means when the input signal reverts to its original state.

According to another aspect of the present invention there is provided a method of controlling an electrical system in response to a first or second program including the steps of running both the first and second programs at the same time, providing control for the system by only one of the programs and subsequently switching control of the system to the other of the programs in response to change in an external stimulus.

Control of the system is preferably switched to the other program by operation of a hardware switch. Both programs preferably continue to run following switching, the one program being switched back to control the system when the external stimulus reverts to its original state.

According to a further aspect of the present invention there is provided a method of controlling an electrical power supply system including a power generator and a plurality of items of electrical equipment connected to be supplied with power from the generator, the method including the steps of monitoring operation of the power generator, running a first program enabling supply of power to each item of equipment, running a second program at the same time as the first program, the second program enabling supply of power to only selected items of said equipment, supplying the results of only the first program via a hardware switch to control of the system when the operation of the power generator is sufficient to supply all items of equipment, and changing the state of the switch when operation of the power generator is insufficient to supply all items of equipment so that the results of the second program are instead supplied to control of the system.

The first program may be maintained running after change in the state of the switch, the switch being changed back to its original state when operation of the power generator is sufficient to supply all the items of equipment so that the results of the first program are again supplied to control of the system.

An aircraft power supply system and its method of control, in accordance with the present invention, will now be described, by way of example, with reference to the accompanying drawing.

BRIEF DESCRIPTION OF THE DRAWING

The drawing shows the system schematically.

DETAILED DESCRIPTION OF THE PREFERRED EMBODIMENT OF THE INVENTION

The aircraft power supply system has two power generators 10 and 20 both rated at 120 kVA for continuous operation. The generators 10 and 20 can be operated at higher power without damage for short periods. In particular, they can be operated at up to 160 kVA for up to 5 minutes and at between 160 kVA and 180 kVA for 5 seconds. The generators can only be operated above 180 kVA for very short periods of 5 ms or less.

The generators 10 and 20 are connected to respective power buses 11 and 21, which are electrically isolated from one another but which can be interconnected via a tie 1 and a switch 2.

The system also includes various items of electrical equipment, of which only twelve are shown, six items 101 to 106 being connected to the left-hand bus 11 and the remaining six items 201 to 206 being connected to the right-hand bus 21. Each item of equipment 101 to 106, 201 to 206 is connected to its respective bus 11 and 21 via a respective relay 111 to 116 and 211 to 216. Each relay is connected to a processing unit 3, which provides appropriate control to maintain the relays open or closed as desired. The processing unit 3 is also connected via line 30 to the tie switch 2 to control operation of this switch.

The processing unit 3 has various inputs 31 to 33 such as, for example, temperature sensors, fire sensors and current sensors associated with the different items of equipment. The signals from the inputs 31 to 33 are used in an algorithm or other program run by the processing unit and indicated by the block A. The algorithm computes which of the relays 111 to 116 to 211 to 216 should be open and which should be closed and supplies appropriate signals to an output stage 34 in the unit by which the relays are powered. The time period for the processing cycle of the algorithm might typically be about 20 ms. In addition to the algorithm A, the processing unit 3 also runs a second algorithm B at the same time. This algorithm computes what outputs should be supplied to the relays 111 to 116 to 211 to 216 if one of the generators 10 or 20 should fail, such that only a single generator is available to supply the loads. The results of these computations are, however, not utilized during normal operation, with both generators in correct operation. The processing unit 3 also includes a hardware switch 35 connected to receive outputs from the two generators 10 and 20. The hardware switch 35 has two states. In the state shown, it connects the results of the algorithm A to the output stage 34. If one of the generators 10 or 20 should fail, the switch 35 rapidly changes state and connects the other algorithm B to the output stage 34. Switching of the hardware switch 35 can be achieved in about 1 to 3 ms, that is, considerably quicker than the processing cycle of the processor unit 3. The second algorithm B also receives the inputs 31 to 33 and performs different calculations from the first algorithm. Algorithm B is initially set to command all non-essential loads to be shed such that, as soon as the generator fails and the switch 35 selects algorithm B to the output, all the non-essential loads are immediately disconnected. A command is then issued to close the switch 2, so that the tie 1 links the two buses 11 and 21, thereby enabling equipment connected to both buses to be supplied by the single, operational generator 10 or 20. The shedding of the non-essential loads ensures that the total load after tie 1 has closed will always be within the capability of the working generator. Algorithm B then compares the connected loads with the power available from the working generator and restores as many non-essential loads as possible without causing an overload.

During this period of operation, when load has been shed, the first algorithm A continues to be run in the processing unit. In this way, if the failed generator should become operational again, the switch 35 would revert to its original state and connect the first algorithm A to control of the relays.

The present invention enables power to be restored to essential equipment very quickly following a generator failure, without the risk of overloading the working generator, and without the need to provide excessively large generators each capable of driving all the loads by itself. It also permits restoration of non-essential loads if spare power is available. Because both programs in the processing unit 3 are run at the same time, there is no need to interrupt the non-operational program when it is switched out of control, since it can be allowed to continue running but without having any control effect, thereby ensuring that the process is entirely deterministic.

The invention is not confined to aircraft power systems but can be used in other applications where it is necessary to produce a rapid changeover between different control algorithms or other programs. The invention is not limited to use with two programs but could be used with three or more programs.

What I claim is:

1. An electrical system comprising: a plurality of items of electrical equipment; a processor having an input and an output; a power generator; connections between said items of equipment and said power generator, said generator being operative to provide a source of an input signal indicative of whether or not said power generator provides sufficient power for the system, said processor being operative to run a first program enabling supply of power to each said item of equipment and to run at the same time a second program different from said first program controlling disconnection of one or more items of said equipment from said power generator, and said processor having a switch and a connection between said switch and said source, said switch being operable in response to change in said input signal when said processor is providing the result of said first program to said output, to switch the result of the second program(s) to said output so as to disconnect equipment from said power generator in response to loss of power from said generator.

2. An electrical system according to claim 1, wherein each said connection between said electrical equipment and said power generator includes a respective relay, and wherein the system includes connections between said output of said processor and said relays such that said second program controls operation of said relays.

3. An electrical system according to claim 1, wherein the system includes two said power generators, and wherein said input signal is indicative of correct operation of said two generators.

4. An electrical system according to claim 3 wherein the system includes two power buses connected to respective ones of the generators, wherein some of the items of said equipment are connected to one bus and others are connected to the other bus, and wherein the system includes a second switch connected between said two buses, and a connection between said second switch and an output of said processor, said second switch being normally open but being closed in response to operation of said second program.

5. A method of controlling an electrical power supply system including a power generator and a plurality of items of electrical equipment connected to be supplied with power from said generator, wherein the method includes the steps of monitoring operation of said power generator, running a first program enabling supply of power to each said item of equipment, running a second program at the same time as said first program, said second program enabling supply of power to only selected items of said equipment, supplying the results of only said first program via a hardware switch to control of the system when the operation of said power generator is sufficient to supply all said items of equipment, and changing the state of said switch when operation of said power generator is insufficient to supply all said items of equipment so that the results of said second program are instead supplied to control of the system and all but said selected items of equipment are disconnected from said generator.

6. A method according to claim 5, wherein said first program is maintained running after change in the state of said switch, and wherein said switch is changed back to its original state when operation of said power generator is sufficient to supply all said items of equipment so that the results of said first program are again supplied to control of the system.

* * * * *